United States Patent
Yoshimoto et al.

(10) Patent No.: US 9,457,701 B2
(45) Date of Patent: Oct. 4, 2016

(54) SEAT HEATER AND SEAT COVER WITH SAME

(71) Applicant: Panasonic Intellectual Property Management Co., Ltd., Osaka (JP)

(72) Inventors: Koji Yoshimoto, Shiga (JP); Takaaki Hyoudou, Kyoto (JP); Yoshimitsu Fujiwara, Shiga (JP); Kazumi Nagayama, Shiga (JP); Masaki Hanada, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/648,714

(22) PCT Filed: Dec. 3, 2013

(86) PCT No.: PCT/JP2013/007067
§ 371 (c)(1),
(2) Date: Jun. 1, 2015

(87) PCT Pub. No.: WO2014/091710
PCT Pub. Date: Jun. 19, 2014

(65) Prior Publication Data
US 2015/0298591 A1    Oct. 22, 2015

(30) Foreign Application Priority Data

Dec. 11, 2012 (JP) ................. 2012-270000
Mar. 6, 2013  (JP) ................. 2013-043682

(51) Int. Cl.
*B60N 2/56*    (2006.01)
*B60N 2/58*    (2006.01)
(Continued)

(52) U.S. Cl.
CPC ........... *B60N 2/5685* (2013.01); *B60N 2/5891* (2013.01); *H05B 3/026* (2013.01);
(Continued)

(58) Field of Classification Search
CPC .... B60N 2/5685; B60N 2/56; B60N 2/5891; A47C 7/74; H05B 3/342; H05B 3/026
USPC .......................................... 297/180.12, 217.3
See application file for complete search history.

(56) References Cited

U.S. PATENT DOCUMENTS 4,865,379 A * 9/1989 Aoki .................... B60N 2/5685
                                                        297/180.12 X
7,942,477 B1    5/2011 Toba et al.
(Continued)

FOREIGN PATENT DOCUMENTS

CN        101434210       5/2009
CN        102404883       4/2012
(Continued)

OTHER PUBLICATIONS

Chinese Search Report dated Dec. 3, 2015 for the related Chinese Patent Application No. 201380054350X, 2 pages.
(Continued)

*Primary Examiner* — Anthony D Barfield
(74) *Attorney, Agent, or Firm* — Hamre, Schumann, Mueller & Larson, P.C.

(57) ABSTRACT

A seat heater includes: a base material; and a heater wire disposed on the base material. The base material has a fold-back portion projecting from an edge of the base material where a cutout portion is formed. The heater wire is disposed on the fold-back portion. In a state where the fold-back portion is folded back toward a base material side, a proximal portion of the fold-back portion is positioned inside the edge of the base material. With such a configuration, the seat heater whose temperature elevation performance is not deteriorated can be realized.

11 Claims, 11 Drawing Sheets

(51) Int. Cl.
*H05B 3/02* (2006.01)
*H05B 3/34* (2006.01)

(52) U.S. Cl.
CPC ....... *H05B 3/342* (2013.01); *H05B 2203/003* (2013.01); *H05B 2203/014* (2013.01); *H05B 2203/016* (2013.01); *H05B 2203/029* (2013.01)

(56) References Cited

U.S. PATENT DOCUMENTS

| 8,641,139 | B2* | 2/2014 | Gerken | H05B 3/06 297/180.12 X |
|---|---|---|---|---|
| 2009/0121525 | A1 | 5/2009 | Nishide et al. | |
| 2010/0206863 | A1 | 8/2010 | Ritter | |
| 2011/0284515 | A1 | 11/2011 | Akaike et al. | |
| 2012/0055914 | A1 | 3/2012 | Goto et al. | |
| 2012/0168420 | A1 | 7/2012 | Ogino et al. | |
| 2013/0106147 | A1* | 5/2013 | Lazanja | B60N 2/5685 297/180.12 |
| 2014/0138992 | A1* | 5/2014 | Feng | B60N 2/5685 297/180.12 |

FOREIGN PATENT DOCUMENTS

| CN | 102510812 | | 6/2012 | |
|---|---|---|---|---|
| DE | 102007042644 | | 3/2009 | |
| JP | 54-108947 | | 8/1979 | |
| JP | 57-128481 | | 8/1982 | |
| JP | 62-152410 | | 7/1987 | |
| JP | 62-059873 | B | 12/1987 | |
| JP | 2-129886 | | 5/1990 | |
| JP | 5-293023 | | 11/1993 | |
| JP | 6-005352 | | 1/1994 | |
| JP | 06005352 | A * | 1/1994 | ............... A47C 7/74 |
| JP | 11-128025 | | 5/1999 | |
| JP | 2003-347016 | | 12/2003 | |
| JP | 3879592 | B | 2/2007 | |
| WO | 9926456 | | 5/1999 | |

OTHER PUBLICATIONS

The Extended European Search Report dated Dec. 11, 2015 for the related European Patent Application No. 13862767.4, 6 pages.
International Search Report of PCT application No. PCT/JP2013/007067 dated Jan. 7, 2014.

* cited by examiner

SEAT HEATER AND SEAT COVER WITH SAME

This Application is a U.S. National Phase Application of PCT International Application PCT/JP2013/007067.

TECHNICAL FIELD

The present invention relates to a seat heater used for warming a vehicle seat for automobiles or electric trains, and a seat cover provided with the seat heater.

BACKGROUND ART

Recently, there has been known an automobile or the like which is provided with a vehicle seat which includes a seat cover having a seat heater as a countermeasure for protecting an occupant from coldness.

A conventional seat heater is configured of a base material and a heater wire. Further, the seat heater is disposed inside a skin which forms the seat cover, and is fixed to the skin by sewing (see PTL 1, for example).

Further, to enhance an aesthetic design of the seat cover, quilting is performed on the skin in many cases. In such cases, quilting is performed by sewing wadding to the skin and, thereafter, the seat heater is mounted on the skin.

The reason is as follows. When quilting is performed after the skin, the wadding and the seat heater are integrally formed, it is often the case where a heater wire of the seat heater is broken by a sewing needle. Accordingly, the seat heater is mounted on the skin to which the wadding is sewn by a method such as sticking.

In view of the above, there has been a demand for a seat heater whose heater wire is not broken even when quilting is performed after the skin, the wadding and the seat heater are integrally formed.

Further, when quilting is performed after the skin and the wadding are integrally formed, it is necessary to use wadding having a large thickness to impart a feeling of large thickness to the seat cover. However, when the wadding having a large thickness is used, since the seat heater is mounted on the wadding after quilting is performed, a distance between a surface of the skin of the seat cover and the seat heater is large. Accordingly, there have been drawbacks with respect to a temperature elevation performance and comfortableness such as a drawback that a time until heat generated by the seat heater reaches the surface of the skin of the seat cover is delayed.

CITATION LIST

Patent Literature

PTL 1: Unexamined Japanese Patent Publication No. 2-129886

SUMMARY OF THE INVENTION

To overcome the above drawbacks, the seat heater according to the present invention includes: a base material; and a heater wire disposed on the base material, wherein the base material has a fold-back portion projecting from an edge of the base material where a cutout portion is formed. The heater wire is disposed on the fold-back portion. In a state where the fold-back portion is folded back toward a base material side, a proximal portion of the cutout portion of the fold-back portion is positioned inside the edge of the base material.

A seat heater of the present invention includes: a base material; and a heater wire disposed on the base material, wherein the base material has a fold-back portion formed by punching. The heater wire is disposed on the fold-back portion, and in a state where the fold-back portion is folded back toward an edge side of the base material, a distal end portion of the fold-back portion is positioned outside the edge of the base material.

A seat heater of the present invention includes: a base material; and a heater wire disposed on the base material, wherein an opening portion is formed in the base material while leaving a continuous portion in the vicinity of an edge of a predetermined region of the base material, and the heater wire is disposed on the continuous portion.

With the above configurations, even when a seat cover is formed by performing quilting after a skin, a wadding and a seat heater are integrally formed, it is possible to realize the seat heater in which the heater wire is not easily broken.

A seat cover according to the present invention is configured by laminating at least a skin, a wadding, and the above-mentioned seat heater, then, by integrally forming the skin, the wadding and the seat heater by quilting.

With such a configuration, a distance between the skin of the seat cover and the seat heater can be narrowed. As a result, it is possible to realize a seat cover having excellent temperature elevation performance in which heat generated by the seat heater can be effectively transferred to the skin within a short time.

DESCRIPTION OF EMBODIMENTS

Hereinafter, exemplary embodiments of the present invention are described with reference to drawings. Note that the present invention is not limited by the exemplary embodiments.

(First Exemplary Embodiment)

Hereinafter, a seat heater according to the first exemplary embodiment of the present invention is described with reference to FIG. 1 to FIG. 5. The seat heater of this exemplary embodiment is applicable to a seat cover of a vehicle seat of a vehicle or the like, for example.

Firstly, the seat cover into which the seat heater of this exemplary embodiment is incorporated and the vehicle seat are described with reference to FIG. 5.

Figure 5:
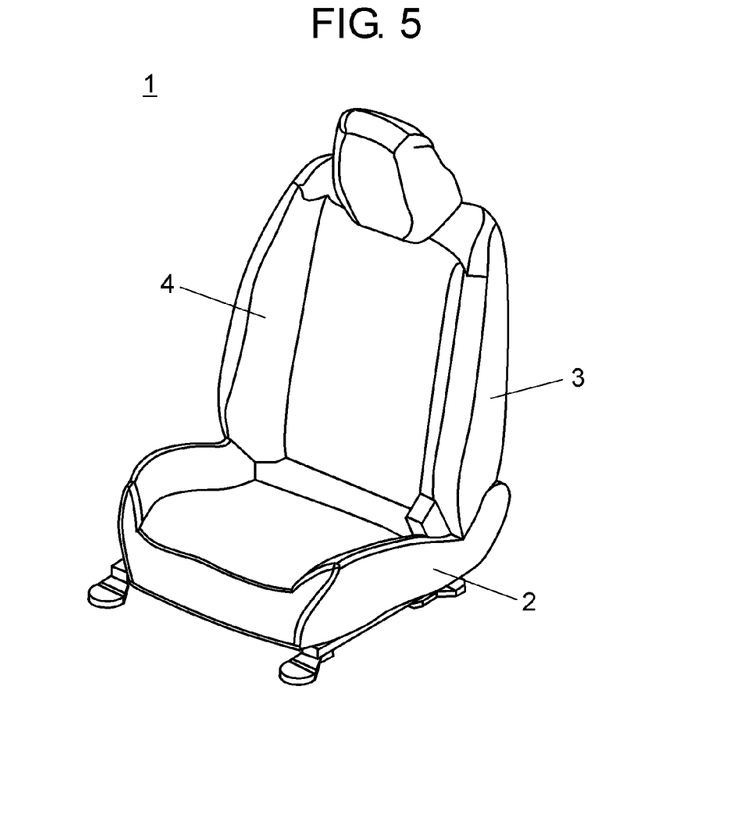
FIG. 5 is a perspective view showing an external appearance of a vehicle seat of the first exemplary embodiment.

FIG. 5 is a perspective view showing an external appearance of the vehicle seat of this exemplary embodiment.

As shown in FIG. 5, vehicle seat 1 of a vehicle or the like is configured of; seat portion 2 on which a user sits; and backrest portion 3. A front surface of vehicle seat 1 is covered with seat cover 4. Quilting (not shown) is performed on seat cover 4, and seat heater 5 described hereinafter is disposed in the inside of seat cover 4.

Next, the configuration of the seat heater of this exemplary embodiment will be described with reference to FIG. 1 to FIG. 3.

Figure 1:
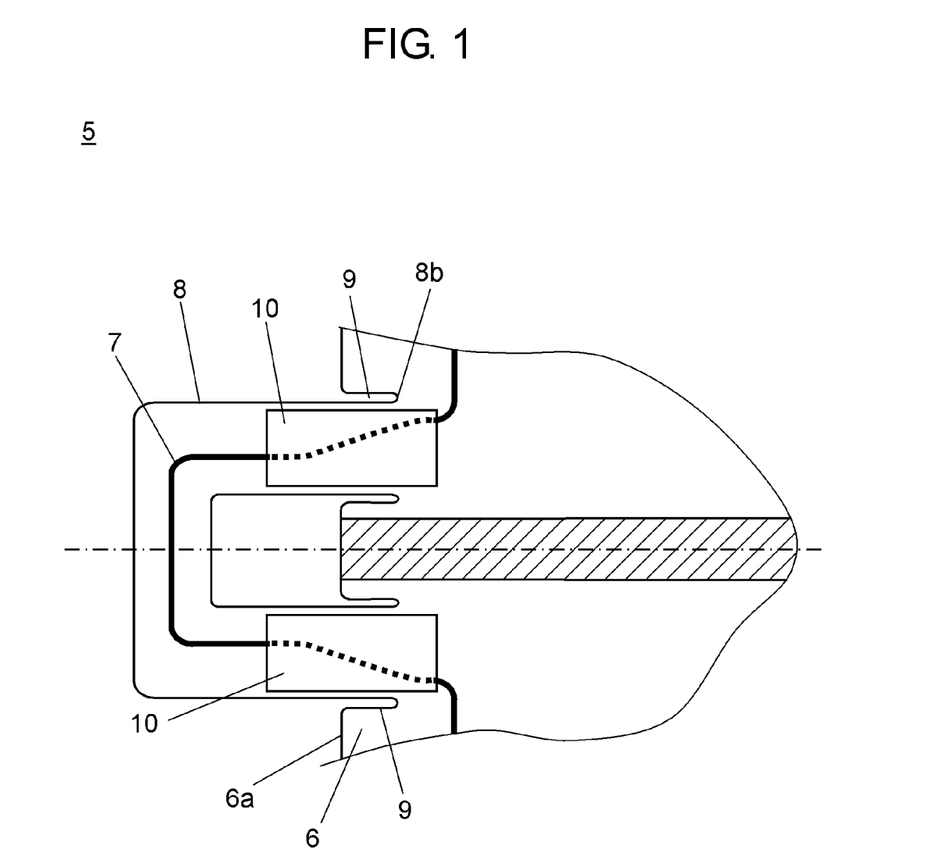
FIG. 1 is an enlarged view of an essential part of a seat heater according to a first exemplary embodiment of the present invention.

FIG. 1 is an enlarged view of an essential part of the seat heater according to the first exemplary embodiment of the present invention. FIG. 2 is an enlarged view of the essential part of the seat heater according to this exemplary embodiment showing a state where a fold-back portion is folded back. FIG. 3 is an external appearance view of the seat heater according to this exemplary embodiment.

Figure 2:
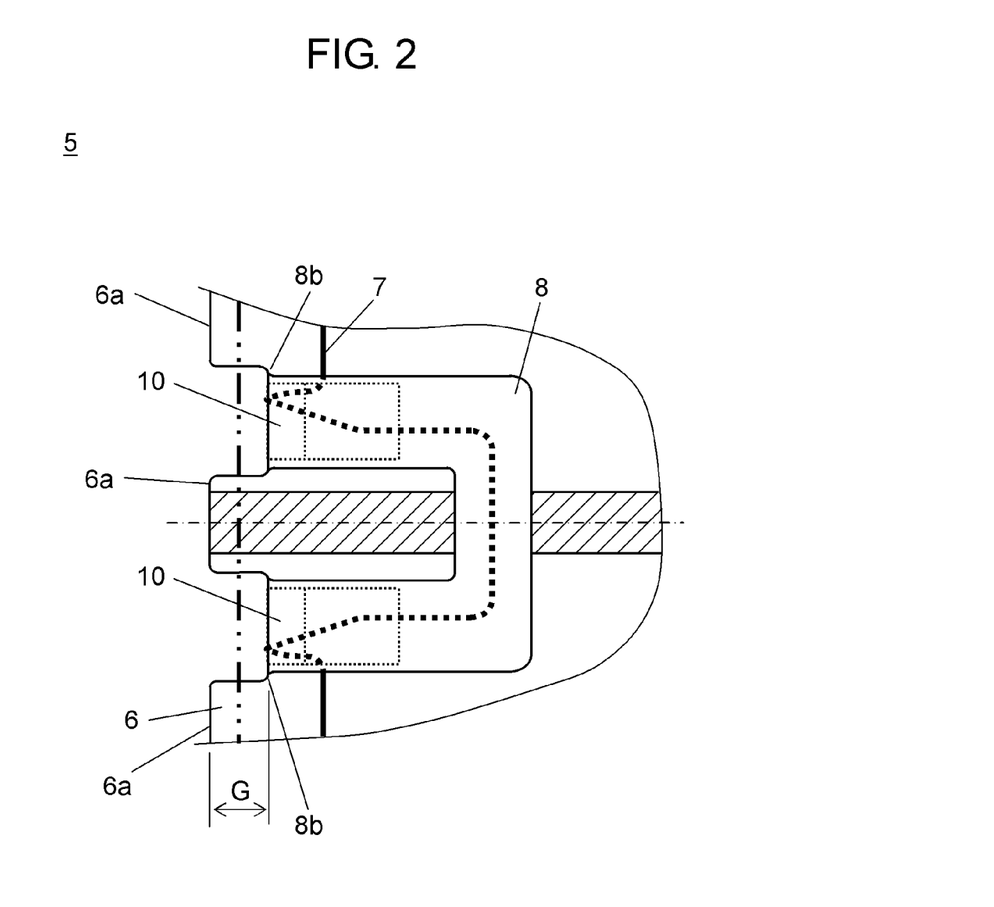
FIG. 2 is an enlarged view of the essential part of the seat heater according to the first exemplary embodiment showing a state where a fold-back portion is folded back.
Figure 3:
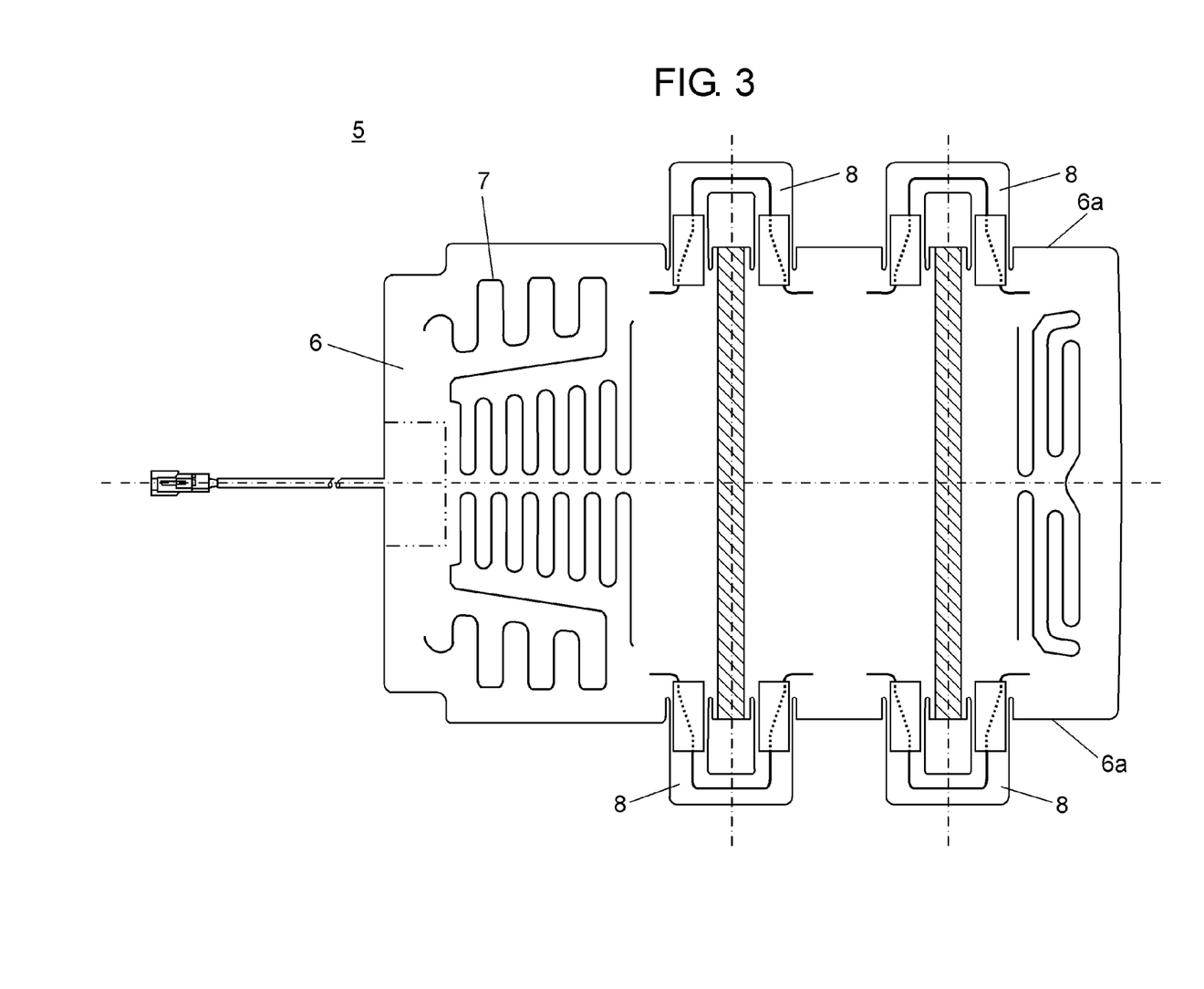
FIG. 3 is an external appearance view of the seat heater according to the first exemplary embodiment.

As shown in FIG. 1 to FIG. 3, seat heater 5 of this exemplary embodiment includes at least: base material 6; and heater wire 7 sewn to base material 6 by threads (not shown), for example. Base material 6 is formed using a flexible material such as a non-woven fabric made of polyester.

Further, fold-back portions 8 having an approximately U shape (including a U shape) and projecting outwardly from edge 6a of base material 6 are formed on respective sides of base material 6 of seat heater 5 such that fold-back portions 8 are disposed opposite to each other. Heater wire 7 is disposed also in each fold-back portion 8.

Furthermore, fold-back portion 8 has cutout portions 9 formed such that cutout portions 9 extend inwardly from edge 6a of base material 6. By forming cutout portions 9, proximal portion 8b of fold-back portion 8 is positioned inside edge 6a of base material 6. Fold-back portion 8 is folded back toward a base material 6 side using proximal portion 8b of fold-back portion 8 as a support portion. With such a configuration, it is possible to prevent the breaking of the heater wire caused by a sewing needle at the time of forming a seat cover described hereinafter as an integral body by performing quilting on the seat cover.

As shown in FIG. 1, heater wire 7 is disposed on fold-back portion 8 such that heater wire 7 is obliquely disposed in the vicinity of proximal portion 8b of fold-back portion 8. With such a configuration, heater wire 7 is not disposed in an overlapping manner in a state where fold-back portion 8 is folded back at proximal portion 8b as shown in FIG. 2.

Here, sheets 10 made of a material having flexibility and insulation property, such as a non-woven fabric made of polyester, are adhered to a front surface of proximal portion 8b of fold-back portion 8 such that sheets 10 cover heater wire 7. By providing sheets 10 in such a manner, heater wire 7 is protected so as not to be broken when fold-back portion 8 is folded back.

Hereinafter, the configuration of the seat cover of this exemplary embodiment will be described with reference to FIG. 4.

Figure 4:
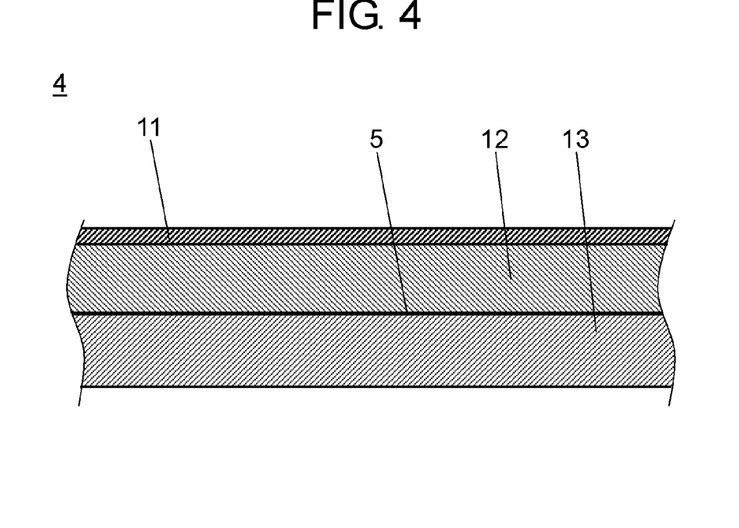
FIG. 4 is a cross-sectional view of an essential part of a seat cover according to the first exemplary embodiment.

FIG. 4 is a cross-sectional view of an essential part of the seat cover according to this exemplary embodiment.

As shown in FIG. 4, seat cover 4 of this exemplary embodiment is formed by laminating at least: skin 11; first wadding 12; seat heater 5; and second wadding 13. First wadding 12 is disposed between skin 11 and seat heater 5, and is made of urethane foam having a small thickness, for example. Second wadding 13 is disposed on a back surface side of seat heater 5, and is made of urethane foam having a small thickness with a lining, for example. A total thickness of first wadding 12 and second wadding 13 corresponds to a thickness of a conventional wadding having a large thickness. Accordingly, it is possible to narrow a distance between seat heater 5 and skin 11 by an amount corresponding to a thickness of the second wadding. As a result, it is possible to realize seat cover 4 having an excellent temperature elevation performance in which heat generated by seat heater 5 is effectively transferred to skin 11 within a short time.

Seat cover 4 of this exemplary embodiment is configured as described above.

Hereinafter, a method of forming the seat cover into which the seat heater of this exemplary embodiment is incorporated is specifically described.

Firstly, seat cover 4 described above in which skin 11, first wadding 12, seat heater 5, and second wadding 13 are laminated to each other is prepared. Here, none of skin 11, first wadding 12, and second wadding 13 are provided on fold-back portion 8 which projects from edge 6a of base material 6 of seat heater 5.

Then, a portion of base material 6 between edges 6a which is surrounded by fold-back portions 8 and is indicated by hatching in FIG. 1 and FIG. 3 is sewn. Quilting is performed on seat cover 4 by such sewing.

In performing quilting, fold-back portion 8 of seat heater 5 is provided in an outwardly projecting manner from skin 11, first wadding 12 and second wadding 13. Accordingly, a sewing operation of quilting can be performed using fold-back portion 8 as a mark. As a result, the operability of the sewing operation is enhanced.

Next, after the quilting is performed on seat cover 4 as described above, as shown in FIG. 2, fold-back portion 8 is folded back toward a second wadding 13 side on a back surface. Then, fold-back portion 8 is fixed to second wadding 13 on a back surface by a tape, an adhesive agent or the like, for example.

Here, in a state where fold-back portion 8 is folded back, proximal portion 8b of fold-back portion 8 is positioned inside edge 6a of base material 6 of seat heater 5. Accordingly, as shown in FIG. 2, distance G for sewing is formed between edge 6a of base material 6 of seat heater 5 and proximal portion 8b of fold-back portion 8. A region of distance G is sewn. By such sewing, it is possible to form the seat cover which is an integral body configured of skin 11, seat heater 5, first wadding 12 and second wadding 13.

That is, in this exemplary embodiment, in performing quilting on seat cover 4, a portion of seat heater 5 between proximal portions 8b of fold-back portions 8 disposed opposite to each other is sewn in a state where fold-back portions 8 of seat heater 5 are in an extended state (in a projecting state). In sewing the portion of seat cover 4 in the vicinity of the edge portion of seat cover 4, firstly, fold-back portion 8 of seat heater 5 is folded back. Then, the region of distance G of seat heater 5 between edge 6a of base material 6 and proximal portion 8b of fold-back portion 8 is sewn.

Accordingly, there is no possibility that heater wire 7 is damaged by a sewing needle at the time of sewing. As a result, it is possible to surely prevent the breaking of heater wire 7.

Further, in this exemplary embodiment, heater wire 7 disposed in the vicinity of proximal portion 8b of fold-back portion 8 is configured not to be disposed in an overlapping manner in a state where fold-back portion 8 is folded back. Accordingly, there is no possibility that a temperature of seat heater 5 becomes locally high in the vicinity of proximal portion 8b of fold-back portion 8. As a result, it is possible to realize a highly safe seat heater and a highly safe seat cover.

Although the example in which fold-back portion 8 is formed into an approximately U shape is described in this exemplary embodiment, the shape of fold-back portion 8 is not limited to such a shape. For example, it is sufficient that heater wire 7 is disposed in a state where both ends of fold-back portion 8 are connected to edge 6a of base material 6, and a distance which allows sewing is formed between both ends of fold-back portion 8. To be more specific, the shape of fold-back portion 8 may be other shapes such as an arcuate shape, for example. By forming fold-back portion 8 into such a shape, it is possible to acquire advantageous effects substantially equal to the above-mentioned advantageous effects.

In this exemplary embodiment, the description has been made about the example in which two fold-back portions 8 are formed on each one of edges 6a formed on both sides of base material 6 as shown in FIG. 3. However, the configuration of fold-back portions 8 is not limited to the above. For example, the desired number of, for example, three or more fold-back portions 8 may be formed on each edge 6a corresponding to the number of portions of a seat cover where quilting is desired. As the number of fold-back portions 8 can be set as desired, the design and strength of the sheet heater or the seat cover can be adjusted as desired.

(Second Exemplary Embodiment)

Hereinafter, a seat heater according to the second exemplary embodiment of the present invention is described with reference to FIG. 6.

Figure 6:
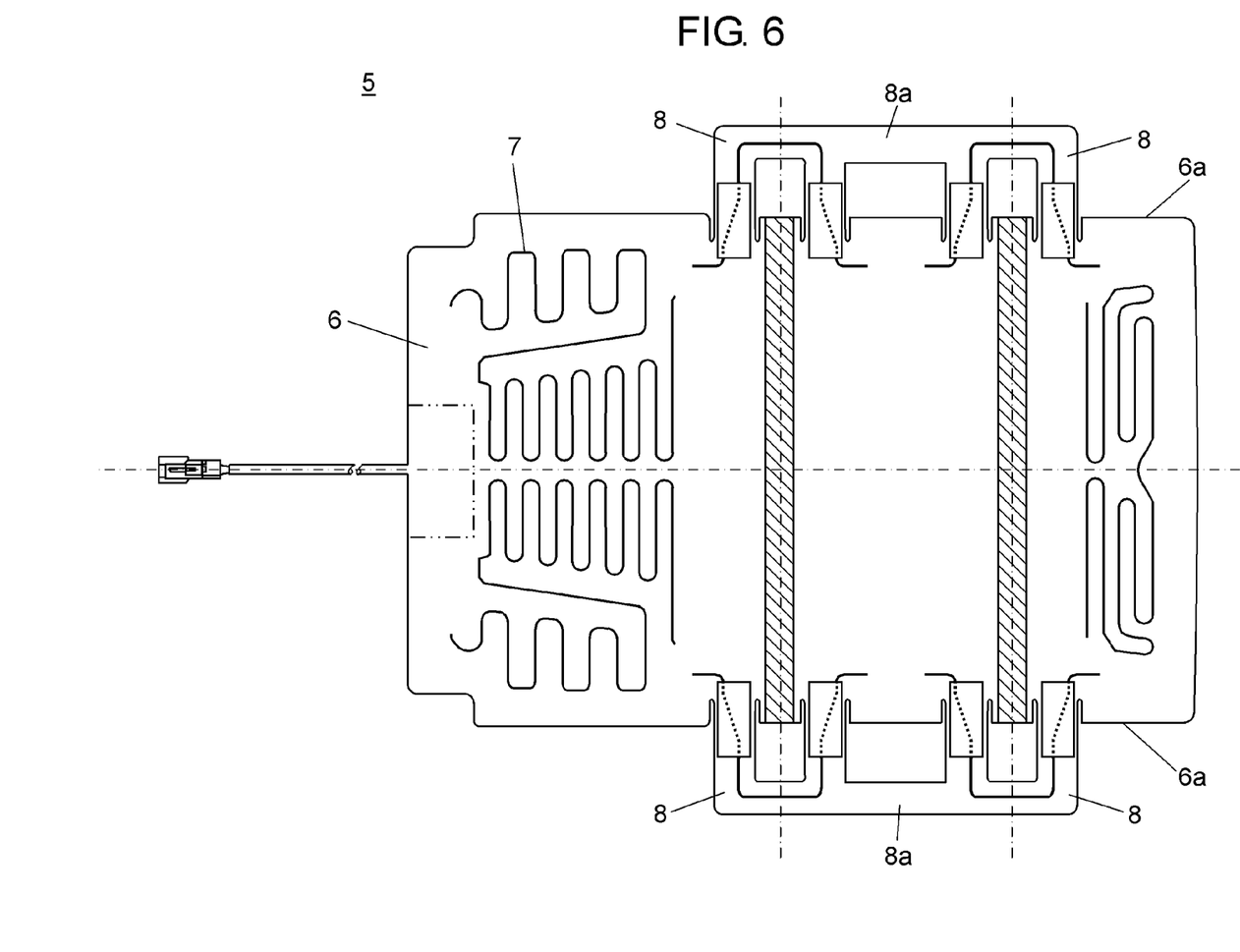
FIG. 6 is an external appearance view of a seat heater according to a second exemplary embodiment of the present invention.

FIG. 6 is an external appearance view of the seat heater according to the second exemplary embodiment of the present invention.

As shown in FIG. 6, the seat heater of the second exemplary embodiment differs from the seat heater of the first exemplary embodiment in that a plurality of fold-back portions 8 are connected to each other with connecting portion 8a. Other configurations of the seat heater of the second exemplary embodiment are substantially equal to the corresponding configurations of the seat heater of the first exemplary embodiment and hence, the description of such configurations is omitted.

That is, as shown in FIG. 6, the plurality of fold-back portions 8 formed on edges 6a on both sides of base material 6 of seat heater 5 are respectively connected to each other with connecting portion 8a so that the plurality of fold-back portions 8 can be formed as an integral body. With such a configuration, fold-back portions 8 on each of edges 6a can be folded back at a time. Accordingly, operability of an operation for folding back fold-back portions 8 can be enhanced.

Note that, connecting portion 8a may be formed integrally with fold-back portion 8 by punching base material 6. Alternatively, connecting portion 8a may be formed as a part separate from fold-back portions 8 and connecting portion 8a may be mounted between fold-back portions 8. When three or more fold-back portions 8 are formed on edges 6a on both sides of base material 6 respectively, at least two or more fold-back portions 8 may be connected to each other with connecting portion 8a. According to such a configuration, the advantageous effect of this exemplary embodiment can also be acquired.

(Third Exemplary Embodiment)

Hereinafter, a seat heater according to the third exemplary embodiment of the present invention is described with reference to FIG. 7 to FIG. 9.

Figure 7:
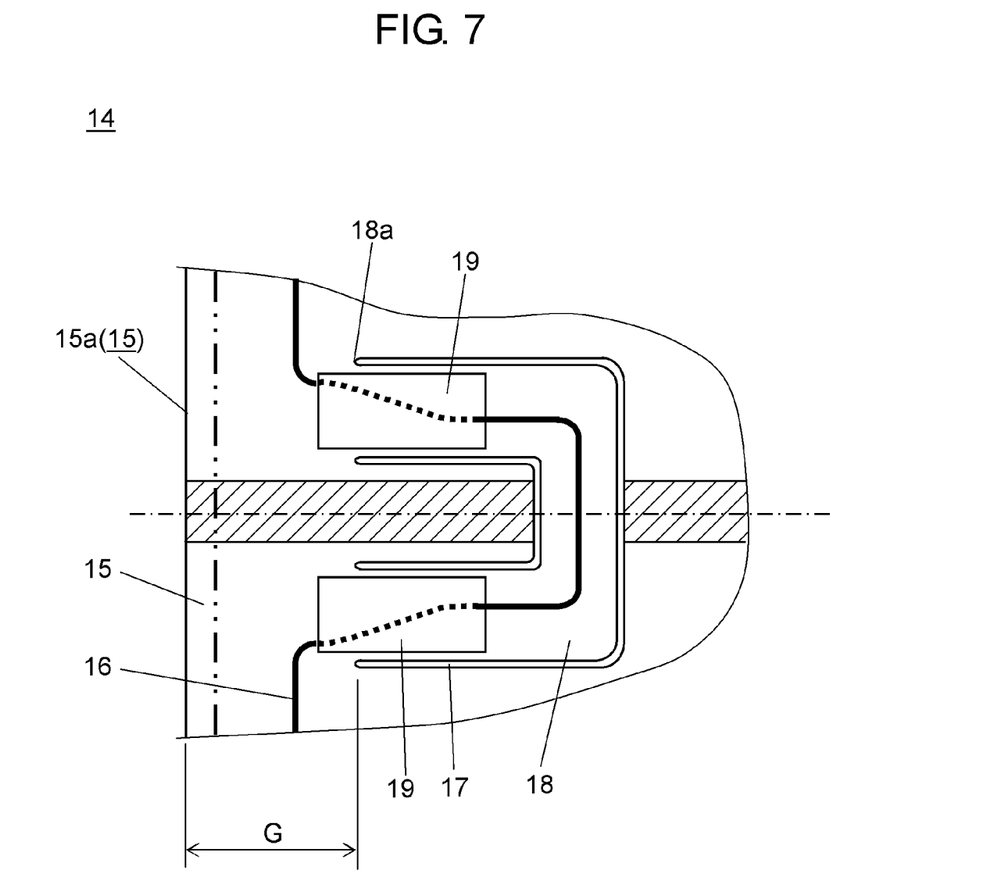
FIG. 7 is an enlarged view of an essential part of a seat heater according to a third exemplary embodiment of the present invention.

FIG. 7 is an enlarged view of an essential part of the seat heater according to the third exemplary embodiment of the present invention. FIG. 8 is an enlarged view of the essential part of the seat heater according to this exemplary embodiment showing a state where a fold-back portion is folded back. FIG. 9 is an external appearance view of the seat heater according to this exemplary embodiment.

As shown in FIG. 7, seat heater 14 of this exemplary embodiment differs from the seat heaters of the first exemplary embodiment and the second exemplary embodiment in that fold-back portion 18 having an approximately U shape (including a U shape) is disposed inside edge 15a of base material 15.

That is, as shown in FIG. 7, fold-back portion 18 having an approximately U shape (including a U shape), for example, is formed in such a manner that cutout portion 17 having an approximately U shape (including a U shape), for example, is formed by punching at a portion of seat heater 14 inside edge 15a of base material 15. Accordingly, fold-back portion 18 is configured to be folded back to an edge 15a side of base material 15 at proximal portions 18a of cutout portion 17.

Figure 8:
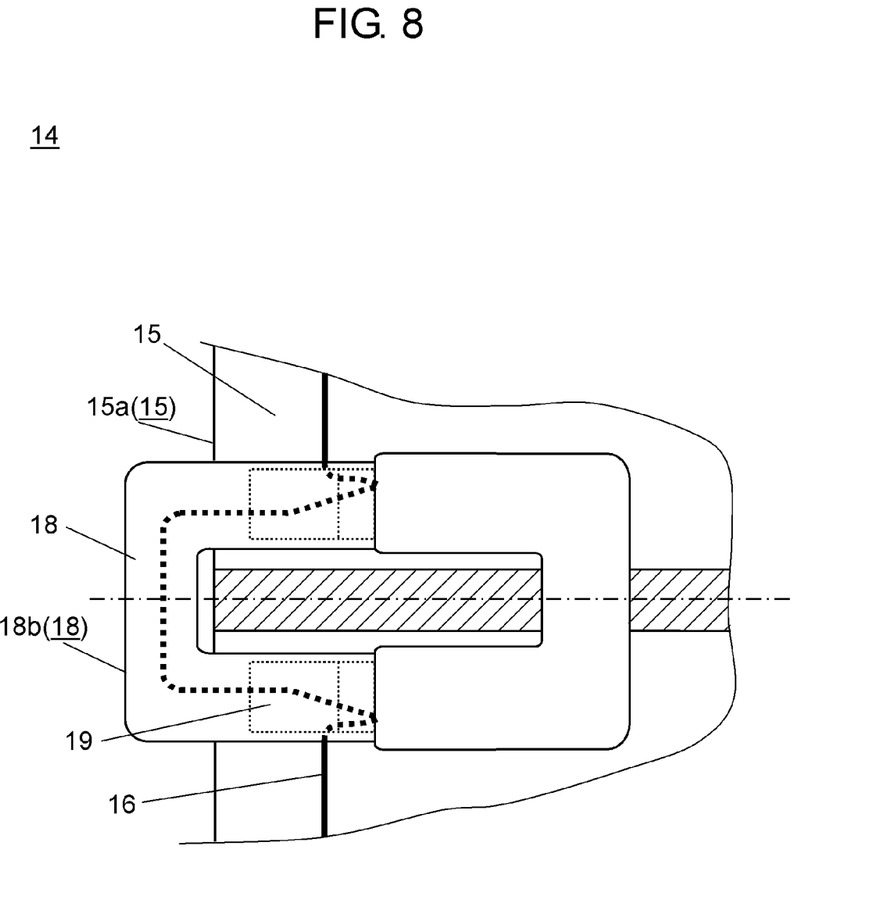
FIG. 8 is an enlarged view of the essential part of the seat heater according to the third exemplary embodiment showing a state where a fold-back portion is folded back.
Figure 9:
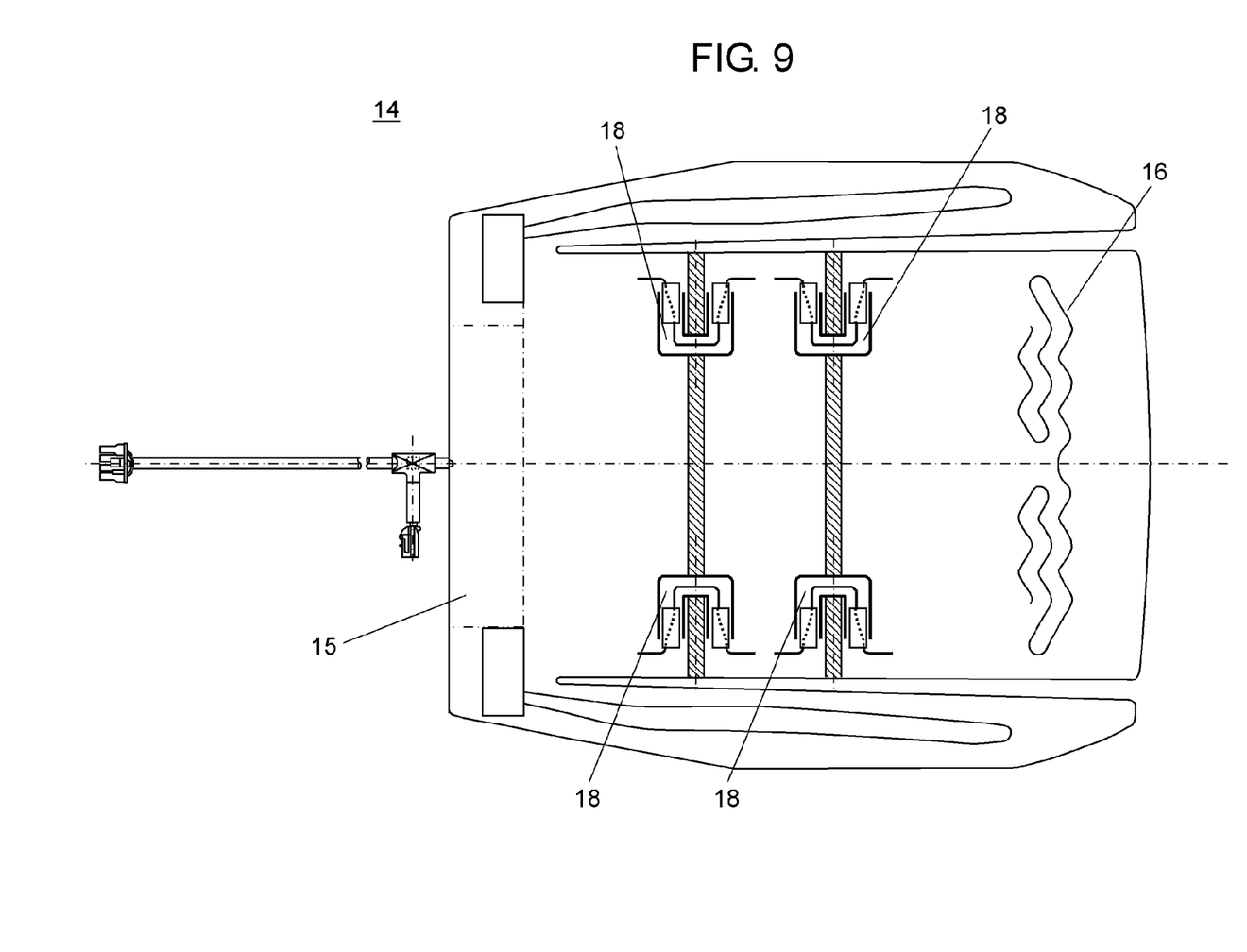
FIG. 9 is an external appearance view of the seat heater according to the third exemplary embodiment.

To be more specific, as shown in FIG. 8, distal end portion 18b of fold-back portion 18 is positioned outside edge 15a of base material 15 of seat heater 14 in a state where fold-back portion 18 is folded back. In a state where fold-back portion 18 is not folded back, fold-back portion 18 is formed at the position and with a size by which distance G for sewing can be formed between proximal portion 18a of fold-back portion 18 and edge 15a of base material 15 of seat heater 14 (a state shown in FIG. 7).

Further, as shown in FIG. 7, heater wire 16 which is disposed on fold-back portion 18 is formed such that heater wire 16 is obliquely disposed in the vicinity of proximal portion 18a of fold-back portion 18. With such a configuration, as shown in FIG. 8, in a state where fold-back portion 18 is folded back at proximal portion 18a, heater wire 16 is not disposed in an overlapping manner. In this exemplified embodiment, sheets 19 formed of a material having flexibility and insulating property, for example, a non-woven fabric made of polyester are adhered to front surfaces of proximal portions 18a of fold-back portion 18 such that sheets 19 cover heater wire 16. Accordingly, heater wire 16 is protected so as not to be broken when fold-back portion 18 is folded back.

The seat heater of this exemplary embodiment is configured as described above, and a seat cover of this exemplary embodiment is configured in the same manner as the seat cover of the first exemplary embodiment.

Hereinafter, a method of forming the seat cover into which the seat heater of this exemplary embodiment is incorporated is described with reference to FIG. 4.

Firstly, a seat cover in which constitutional elements are laminated in the same manner as the seat cover of the first exemplary embodiment is prepared. At this stage of operation, skin 11, first wadding 12 and second wadding 13 are provided over the whole region of base material 15 of seat heater 14. As shown in FIG. 8, in a state where fold-back portion 18 is folded back, seat heater 14 is mounted between first wadding 12 and second wadding 13 in seat cover 4 on which quilting is performed, for example.

Next, a portion of base material 15 between edges 15a of base material 15 which is surrounded by fold-back portions 18 disposed opposite to each other and is indicated by hatching in FIG. 8 is sewn. Quilting is performed on seat cover 4 in this manner.

In performing quilting, in the same manner as the first exemplary embodiment, fold-back portions 18 are disposed such that fold-back portions 18 project outwardly from skin 11, first wadding 12 and second wadding 13. Accordingly, a sewing operation of quilting can be performed using fold-back portion 18 as a mark. As a result, the operability of the sewing operation is enhanced.

Moreover, in second wadding 13 positioned on a side opposite to skin 11 of seat cover 4, a slit-like hole (not shown) having a T shape, for example, which allows fold-back portion 18 to pass therethrough is formed at a position corresponding to proximal portion 18a of fold-back portion 18. To be more specific, a lateral bar of the T shape corresponds to proximal portion 18a of fold-back portion 18, and a vertical bar of the T shape corresponds to a slit-like hole extending to an edge of second wadding 13.

After the quilting described above is performed on seat cover 4, as shown in FIG. 7, fold-back portion 18 is folded back toward a second wadding 13 side on a back surface through the slit-like hole having a T shape formed in second wadding 13. Accordingly, fold-back portion 18 is folded back toward the inside of the vertical bar portion of the T shape. Then, fold-back portion 18 is fixed to second wadding 13 on the back surface by a tape, an adhesive agent or the like, for example.

Next, in a state where fold-back portion 18 is fixed to second wadding 13, a region of distance G of base material 15 on an edge 15a side from fold-back portion 18 is sewn. By such sewing, it is possible to form the seat cover which is an integral body configured of skin 11, seat heater 14, first wadding 12 and second wadding 13.

That is, in this exemplary embodiment, in performing quilting on seat cover 4, a portion of base material 15 between proximal portions 18a of fold-back portions 18 which are disposed opposite to each other are sewn in a state where fold-back portions 18 of seat heater 14 are folded back. In sewing a portion of seat cover 4 in the vicinity of the edge portion of seat cover 4, fold-back portions 8 of seat heater 5 are extended, and the region of distance G of seat heater 14 between edge 15a of base material 15 and proximal portion 18a of fold-back portion 18 is sewn. Accordingly, there is no possibility that heater wire 7 is damaged by a sewing needle at the time of sewing. As a result, it is possible to surely prevent the breaking of heater wire 7.

Further, in this exemplary embodiment, when seat heater 14 is mounted on seat cover 4 eventually, seat heater 14 is mounted on seat cover 4 in a state where fold-back portion 18 of seat heater 14 is not folded back. Accordingly, a load generated by folding back fold-back portions 18 is not applied to heater wire 16 and hence, the occurrence of the breaking of heater wire 16 can be suppressed. As a result, reliability of seat heater 14 can be enhanced.

Further, in this exemplary embodiment, the portion of base material 15 on an edge 15a side from fold-back portion 18 is sewn and hence, there is no possibility that heater wire 16 is damaged by a sewing needle. As a result, it is possible to surely prevent the breaking of heater wire 16.

(Fourth Exemplary Embodiment)

Hereinafter, a seat heater according to the fourth exemplary embodiment of the present invention is described with reference to FIG. 10 to FIG. 13.

Figure 10:
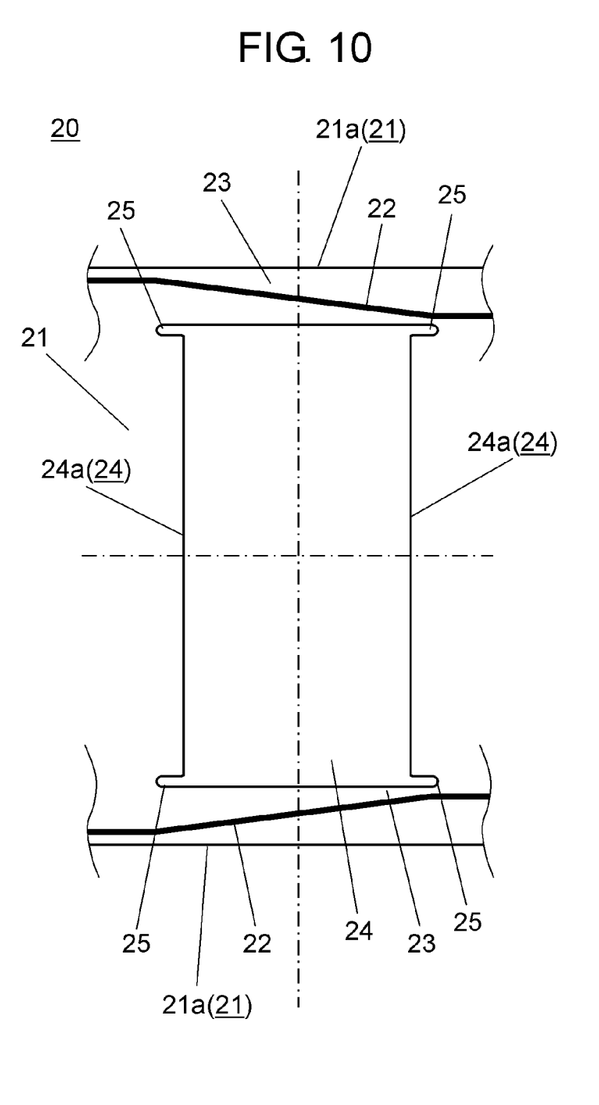
FIG. 10 is an external appearance view of a seat heater according to a fourth exemplary embodiment of the present invention.

FIG. 10 is an external appearance view of the seat heater according to the fourth exemplary embodiment of the present invention.

As shown in FIG. 10, in the same manner as the first exemplary embodiment, seat heater 20 of the fourth exemplary embodiment includes at least: base material 21; and heater wire 22 sewn to base material 21 by threads (not shown), for example.

Opening portion 24 is formed in base material 21 of seat heater 20 by punching, for example, while leaving continuous portions 23 at both edges 21a of a predetermined region of base material 21. Further, heater wire 22 is disposed on continuous portions 23. With such a configuration, heater wires 22 disposed on base material 21 on both sides of opening portion 24 are connected to each other. A portion in the vicinity of edge 21a of a predetermined region of base material 21 in this exemplary embodiment is a side which corresponds to edge 6a of base material 6 where fold-back portion 8 described in the first exemplary embodiment or the like is formed.

The seat heater of this exemplary embodiment is configured as described above, and a seat cover of this exemplary embodiment is configured in the same manner as the seat cover of the first exemplary embodiment.

Hereinafter, a method of forming the seat cover into which the seat heater of this exemplary embodiment is incorporated is described with reference to FIG. 11 to FIG. 13 while also referencing FIG. 4 and FIG. 10.

Figure 11:
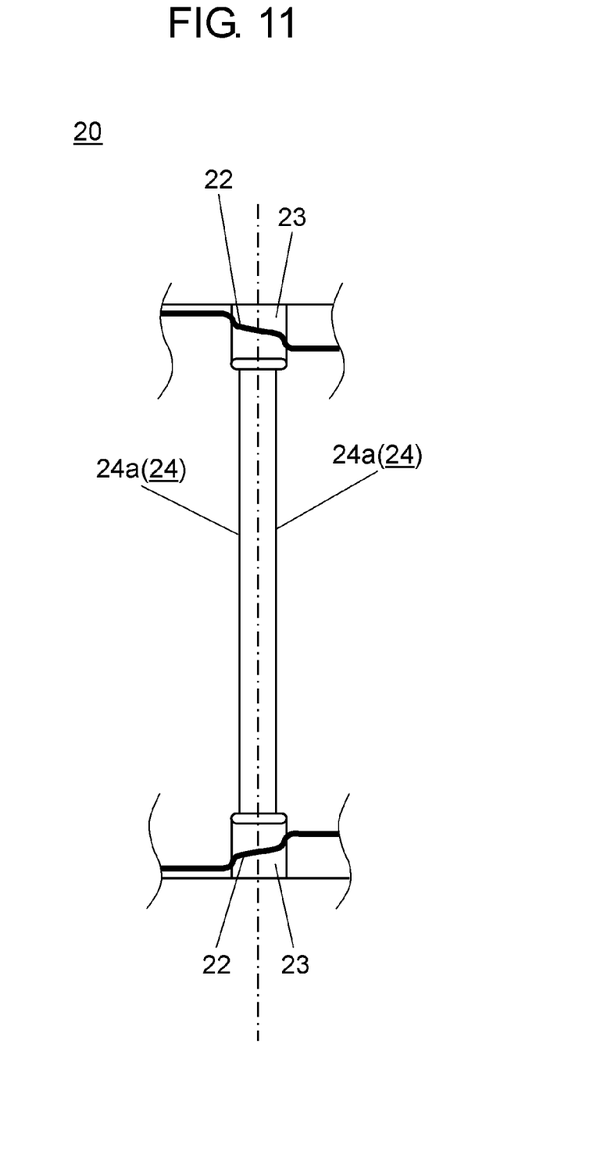
FIG. 11 is an external appearance view of the seat heater showing a state where edges of an opening portion according to the fourth exemplary embodiment are made to abut each other.

FIG. 11 is an external appearance view of the seat heater in a state where edges of opening portion according to the exemplary embodiment are made to abut each other. FIG. 12 is a perspective view showing the state where the edges of the opening portion according to the exemplary embodiment are made to abut each other. FIG. 13 is a perspective view showing the state where the edges of the opening portion according to the exemplary embodiment are made to abut each other and continuous portions are deformed.

Figure 12:
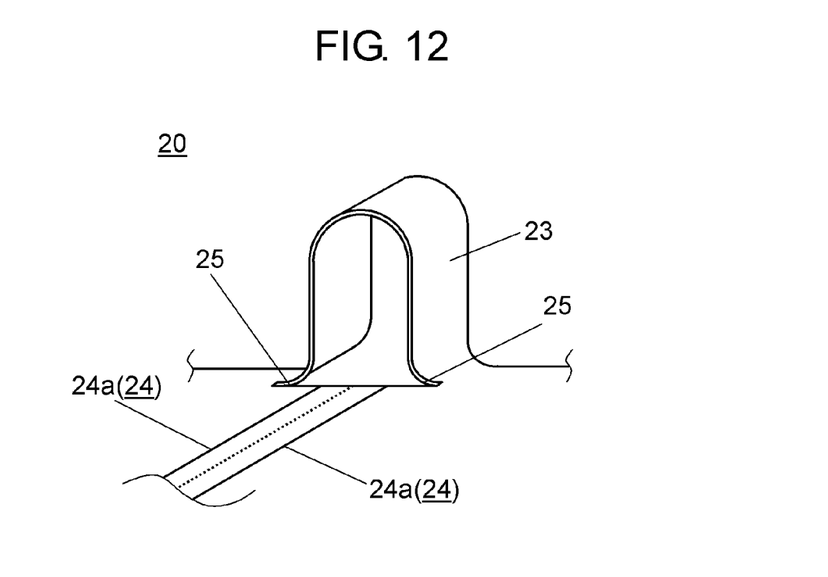
FIG. 12 is a perspective view showing a state where the edges of the opening portion according to the fourth exemplary embodiment are made to abut each other.
Figure 13:
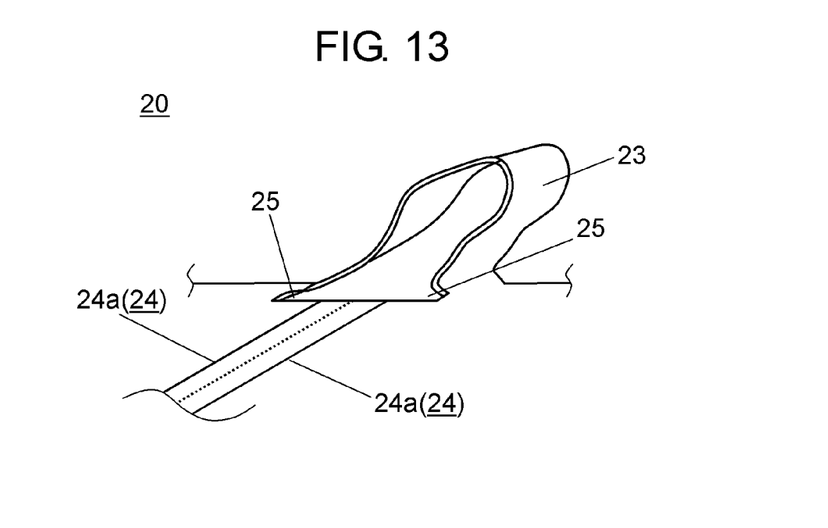
FIG. 13 is a perspective view showing a state where the edges of the opening portion according to the fourth exemplary embodiment are made to abut each other, and a continuous portion is deformed.

Firstly, as shown in FIG. 11 and FIG. 12, edges 24a of opening portion 24 formed in base material 21 are made to abut each other. Then, edges 24a of opening portion 24 are temporarily connected to each other by a tape or the like, for example, so as to hold a state where edges 24a of opening portion 24 are made to abut each other. Note that "the state where edges 24a are made to abut each other" also includes a state where edges 24a partially overlap with each other.

Next, skin 11, first wadding 12, seat heater 20 in the above-mentioned state where edges 24a are made to abut each other and are temporarily connected to each other, and second wadding 13 are laminated to each other.

Next, quilting is performed on a region of seat heater 20 which corresponds to opening portion 24 by sewing seat heater 20 at a position (a position indicated by a chain line shown in FIG. 11) between edges 24a of opening portion 24 which are made to abut each other. Here, in performing quilting, as shown in FIG. 13, it is preferable that continuous portions 23 be deformed so as to take a position where the continuous portions 23 does not obstruct the quilting operation. In view of the above, as shown in FIG. 10, cutout portion 25 is formed at both end portions of respective edges 24a of opening portion 24 on continuous portion 23 sides along continuous portions 23. By forming cutout portions 25 as described above, continuous portions 23 can be easily deformed so that the quilting operation can be performed easily.

Next, after the above quilting operation is performed, continuous portion 23 of base material 21 is sewn at a position outside heater wire 22 folded back in the continuous portion 23. By such sewing, it is possible to form the seat cover which is an integral body configured of skin 11, seat heater 20, first wadding 12 and second wadding 13.

Further, according to this exemplary embodiment, as shown in FIG. 10 and FIG. 11, heater wires 22 are obliquely disposed on continuous portions 23. Accordingly, even when continuous portion 23 is sewn in a folded-back state, there is no possibility that heater wire 22 is disposed in an overlapping manner. As a result, it is possible to realize a highly safe seat heater and a highly safe seat cover provided with the seat heater by preventing a temperature of the seat heater from becoming locally high due to the overlapping of heater wire 22.

According to this exemplary embodiment, sewing is performed on continuous portion 23 at a position outside heater wire 22. Accordingly, there is no possibility that heater wire 22 is damaged by a sewing needle. As a result, it is possible to prevent the breaking of heater wire 22.

Note that in this exemplary embodiment, the description has been made about the example in which heater wire 22 is directly formed on continuous portion 23. However, the method of forming heater wire 22 is not limited to the above example. For example, it is preferable that a sheet made of a material having flexibility and insulating property such as a non-woven fabric made of polyester, be adhered to continuous portion 23 such that the sheet covers heater wire 22. By adhering the sheet to continuous portion 23 in this manner, it is possible to protect heater wire 22 from breaking in a state where continuous portion 23 is sewn.

In the above respective exemplary embodiments, the descriptions have been made by taking the configuration in which the wadding is divided into the first wadding and the second wadding, and the seat heater is disposed between the first wadding and the second wadding as an example. Note that the configuration is not limited to such a configuration. For example, the seat heater may be provided between the wadding formed of an integral body of the first wadding and the second wadding, and the skin. By adopting such a configuration, it is possible to further enhance the temperature elevation performance of the seat heater.

INDUSTRIAL APPLICABILITY

The seat heater of the present invention is disposed on seats of automobiles, airplanes, electric trains and the like, and generates heat so that a user can comfortably take a seat even in a cold season. Further, the seat heater of the present invention is also applicable to a seat on which a user sits such as a hot water cleaning toilet seat.

REFERENCE MARKS IN THE DRAWINGS 1 vehicle seat
2 seat portion
3 backrest portion
4 seat cover
5, 14, 20 seat heater
6, 15, 21 base material
6a, 15a, 21a, 24a edge
7, 16, 22 heater wire
8, 18 fold-back portion
8a connecting portion
8b, 18a proximal portion
9, 17, 25 cutout portion
10, 19 sheet
11 skin
12 first wadding
13 second wadding
18b distal end portion
23 continuous portion
24 opening portion

The invention claimed is:

1. A seat heater comprising:
   a base material; and
   a heater wire disposed on the base material,
   wherein the base material has a U-shaped fold-back portion projecting from an edge of the base material where a cutout portion is formed,
   the heater wire is disposed on the U-shaped fold-back portion, and
   in a state where the fold-back portion is folded back toward a base material side, the heater wire disposed on the fold-back portion is folded with the fold-back portion and a proximal portion of the cutout portion of the fold-back portion is positioned inside the edge of the base material.

2. The seat heater according to claim 1, wherein the base material has a plurality of the fold-back portions at the edge of the base material, and the fold-back portions are connected to each other with a connecting portion.

3. The seat heater according to claim 1, wherein the heater wire is disposed obliquely at least in the vicinity of the fold-back portion so as to prevent the heater wire from being overlapped when folded.

4. A seat cover configured by laminating at least a skin, a wadding and the seat heater according to claim 1, then, by integrally forming the skin, the wadding and the seat heater by quilting.

5. The seat cover according to claim 4, wherein the wadding is configured of a first wadding and a second wadding, and the seat heater is disposed between the first wadding and the second wadding.

6. The seat cover according to claim 4, wherein the seat heater is disposed between the skin and the wadding.

7. A seat heater comprising:
   a base material; and
   a heater wire disposed on the base material,
   wherein the base material has a U-shaped fold-back portion formed inside an edge of the base material,
   the heater wire is disposed on the U-shaped fold-back portion, and
   in a state where the fold-back portion is folded back toward the edge side of the base material, the heater wire disposed on the fold-back portion is folded with the fold-back portion and a distal end portion of the fold-back portion is positioned outside the edge of the base material.

8. The seat heater according to claim 7, wherein the heater wire is disposed obliquely at least in the vicinity of the fold-back portion so as to prevent the heater wire from being overlapped when folded.

9. A seat cover configured by laminating at least a skin, a wadding and the seat heater according to claim 7, then, by integrally forming the skin, the wadding and the seat heater by quilting.

10. The seat cover according to claim 9, wherein the wadding is configured of a first wadding and a second wadding, and the seat heater is disposed between the first wadding and the second wadding.

11. The seat cover according to claim 9, wherein the seat heater is disposed between the skin and the wadding.

* * * * *